(12) United States Patent
Yoshida et al.

(10) Patent No.: US 10,082,683 B2
(45) Date of Patent: Sep. 25, 2018

(54) OPTICAL MODULATOR THAT IS FORMED USING FERROELECTRIC SUBSTRATE

(71) Applicant: Fujitsu Optical Components Limited, Kawasaki-shi, Kanagawa (JP)

(72) Inventors: Yoshihiko Yoshida, Sapporo (JP); Masaharu Doi, Sapporo (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/617,478

(22) Filed: Jun. 8, 2017

(65) Prior Publication Data
US 2018/0031869 A1 Feb. 1, 2018

(30) Foreign Application Priority Data

Jul. 27, 2016 (JP) .................................. 2016-147853

(51) Int. Cl.
| | | |
|---|---|---|
| G02F 1/00 | (2006.01) | |
| G02F 1/225 | (2006.01) | |
| G02F 1/21 | (2006.01) | |

(52) U.S. Cl.
CPC ............ *G02F 1/0027* (2013.01); *G02F 1/225* (2013.01); *G02F 2001/212* (2013.01); *G02F 2201/501* (2013.01)

(58) Field of Classification Search
CPC .......................... G02F 1/0227; G02F 2001/212
See application file for complete search history.

(56) References Cited

U.S. PATENT DOCUMENTS

| | | | |
|---|---|---|---|
| 4,767,174 A | 8/1988 | Carenco et al. | |
| 6,044,184 A | 3/2000 | Shafer et al. | |
| 6,128,424 A | 10/2000 | Gampp et al. | |

(Continued)

FOREIGN PATENT DOCUMENTS

| | | |
|---|---|---|
| JP | 60-95410 | 5/1985 |
| JP | 62-73207 | 4/1987 |

(Continued)

OTHER PUBLICATIONS

Japanese Office Action dated May 23, 2017 in Japanese Patent Application No. 2016-147853.

(Continued)

*Primary Examiner* — Omar R Rojas
(74) *Attorney, Agent, or Firm* — Staas & Halsey LLP (57) ABSTRACT

An optical modulator includes: a ferroelectric substrate in which an input optical waveguide, a pair of branched optical waveguides, and an output optical waveguide are formed; a signal electrode that is formed in a vicinity of at least one of the pair of branched optical waveguides; a first protection member that is attached to an input end of the ferroelectric substrate in which the input optical waveguide is formed; and a second protection member that is attached to an output end of the ferroelectric substrate in which the output optical waveguide is formed. The first protection member and the second protection member have a Mohs hardness that is less than or equal to a Mohs hardness of the ferroelectric substrate, and are formed of a glass material that does not have a pyroelectric effect.

4 Claims, 9 Drawing Sheets

(56) References Cited

U.S. PATENT DOCUMENTS

| | | | |
|---|---|---|---|
| 7,787,717 B2* | 8/2010 | Ohmori | G02B 6/125 |
| | | | 385/14 |
| 2003/0147576 A1 | 8/2003 | Doi et al. | |
| 2003/0170467 A1* | 9/2003 | Cornelius | G02B 5/208 |
| | | | 428/447 |
| 2005/0265663 A1 | 12/2005 | Maruyama et al. | |
| 2011/0235178 A1* | 9/2011 | Minami | G02B 5/1876 |
| | | | 359/566 |

FOREIGN PATENT DOCUMENTS

| | | |
|---|---|---|
| JP | 2003-233042 | 8/2003 |
| JP | 2005-345554 | 12/2005 |
| JP | 2007-079225 | 3/2007 |
| JP | 2009-258766 | 11/2009 |
| JP | 2013-186200 | 9/2013 |

OTHER PUBLICATIONS

"Optical Glass Data Book" [online], Sumita Optical Glass Inc., Feb. 1, 2016, Ver. 10.00, p. 24, [searched on May 14, 2017], http://sumita-opt.co.jp/ja/download.

* cited by examiner

CUTTING
DIRECTION

OPTICAL MODULATOR THAT IS FORMED USING FERROELECTRIC SUBSTRATE

CROSS-REFERENCE TO RELATED APPLICATION

This application is based upon and claims the benefit of priority of the prior Japanese Patent Application No. 2016-147853, filed on Jul. 27, 2016, the entire contents of which are incorporated herein by reference.

FIELD

The embodiments discussed herein are related to an optical modulator formed on a ferroelectric substrate.

BACKGROUND

Ferroelectrics that have a strong electro-optic effect are used for optical devices that convert an electric signal into an optical signal. For example, optical modulators that are configured by including a LiNbO3 (lithium niobate) substrate are widely in practical use. The optical modulator that is configured by including a LiNbO3 substrate is sometimes referred to as an LN modulator. Chirping is small in the LN optical modulator and the LN modulator can achieve high-speed modulation.

Figure 1A:
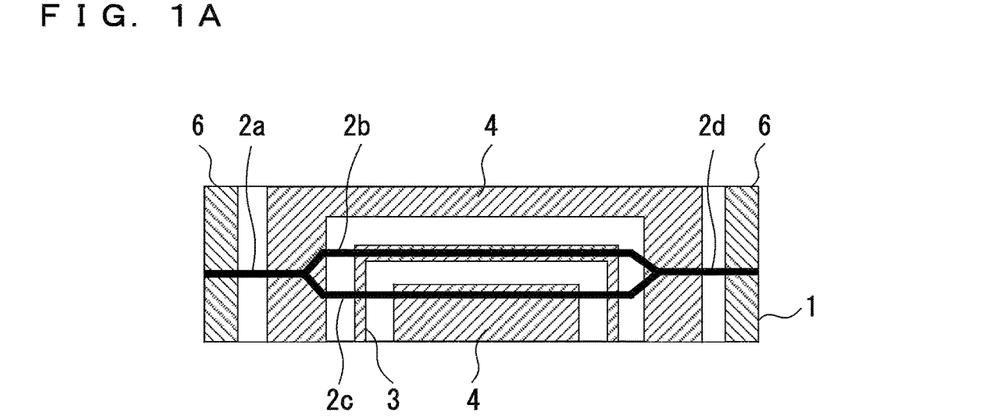
FIGS. 1A and 1B illustrate an example of the configuration of an optical modulator.
Figure 1B:
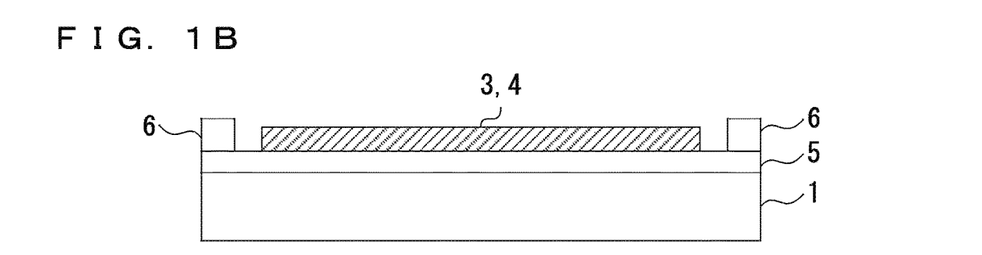

FIGS. 1A and 1B illustrate an example of the configuration of an optical modulator. FIG. 1A is a top view of the optical modulator seen from above. FIG. 1B depicts the optical modulator of FIG. 1A seen from the side.

A substrate 1 is a Z-cut LiNbO3 substrate that is formed in the Z-axis direction of a LiNbO3 crystal. An optical waveguide is formed in the vicinity of the surface of the substrate 1. For example, the optical waveguide is formed by introducing metallic impurities such as Ti in the vicinity of the surface of the substrate 1 and by diffusing the metallic impurities using heat. The optical waveguide includes an input optical waveguide 2a, a pair of straight optical waveguides 2b and 2c, and an output optical waveguide 2d. The straight optical waveguides 2b and 2c are optically coupled to the input optical waveguide 2a. In addition, the straight optical waveguides 2b and 2c are also optically coupled to the output optical waveguide 2d. That is, the optical waveguides 2a-2d form a Mach-Zehnder interferometer. Note that the straight optical waveguides 2b and 2c are formed substantially parallel to each other. In the following description, from among two surfaces of the substrate 1, a surface in which the optical waveguide is formed may be referred to as a "top surface" or a "mounting surface". In addition, the other surface of the substrate 1 may be referred to as a "bottom surface".

On the top surface of the substrate 1, a signal electrode 3 and a ground electrode 4 are formed. The material of the signal electrode 3 and the ground electrode 4 is, for example, gold. In the example illustrated in FIG. 1A, the signal electrode 3 is formed in the vicinity of one of the pair of straight optical waveguides 2b and 2c (in the example, the straight optical waveguide 2b). One end of the signal electrode 3 is electrically connected to an electric signal generator (not illustrated) and the other end of the signal terminal 3 is terminated using a resistor. Note that the electric signal generator generates an electric signal that represents transmission data. The ground electrode 4 is formed in an area where the signal electrode 3 is not formed, on the top surface of the substrate 1. In this example, the ground electrode 4 is formed reaching the area above the straight optical waveguide 2c. A buffer layer 5 is formed between the top surface of the substrate 1 and each electrode (the signal electrode 3 and the ground electrode 4). The buffer layer 5 suppresses light transmission from the optical waveguides (2a-2d) to the electrodes (3 and 4). Note that the buffer layer 5 is realized by an insulating film such as a SiO2 film.

The substrate 1 is cut out from a ferroelectric wafer by dicing. In this case, there is a risk of damaging the optical waveguide that is formed in the end of the substrate 1 (the input optical waveguide 2a and the output optical waveguide 2d depicted in FIG. 1A). Therefore, in order to protect an optical waveguide pattern that is formed in the substrate 1, a dummy block (protective member) is provided on the end of the substrate 1. In an example illustrated in FIGS. 1A and 1B, dummy blocks 6 are provided on an input end and an output end of the substrate 1. The input end means the end of the substrate 1 on the side in which the input optical waveguide 2a is formed. The output end means the end of the substrate 1 on the side in which the output optical waveguide 2d is formed. The dummy block 6 is formed of, for example, the same material as the substrate 1. The dummy block 6 also has the function of holding an optical fiber that is optically coupled to the optical waveguide of the optical modulator.

However, since the substrate 1 is a ferroelectric substrate, the substrate 1 causes a pyroelectric effect due to a temperature change. The pyroelectric effect leads to uneven distribution of electric charge. In a case in which the substrate 1 is a Z-cut substrate, electric charge is concentrated in the area in the vicinity of the top surface of the substrate 1 and the area in the vicinity of the bottom surface of the substrate 1. When the dummy block 6 is formed of a ferroelectric as with the substrate 1, electric charge may be concentrated in the dummy block.

Moreover, when a sharp temperature change occurs, uneven distribution of electric charge may become remarkable, resulting in electric discharging between the substrate 1 and the dummy block 6. The electric discharging between the substrate 1 and the dummy block 6 disturbs the electric field in the substrate 1 and thus decreases the quality of a modulated optical signal generated by the optical modulator.

Note that a technology for reducing uneven distribution of electric charge is proposed (for example, Japanese Laid-open Patent Publication No. 62-73207). An optical modulator that has the function of adjusting an operating point is known (for example, Japanese Laid-open Patent Publication No. 2003-233042). In a known configuration, a reinforcing block is provided at an end portion of a substrate at which an optical waveguide is formed (e.g., Japanese Laid-open Patent Publication No. 2009-258766). A technique has been proposed for suppressing uneven distribution of electric charge by increasing conductivity through a reduction treatment on the surface of a reinforcing block (e.g., Japanese Laid-open Patent Publication No. 2013-186200).

As described above, techniques have been proposed for mitigating a pyroelectric effect (i.e., uneven distribution of electric charge caused by a temperature change). In the prior art, however, the pyroelectric effect within the dummy block 6 is not mitigated. Performing, for example, a reduction treatment on the surface of the dummy block 6 increases the conductivity of the surface region, and this may possibly mitigates a pyroelectric effect. However, the reduction treatment on the surface alone does not mitigate the pyroelectric effect within the dummy block 6. Moreover, even if the surface of the dummy block 6 is reduced, the conductivity is decreased with time by oxidation.

Accordingly, in the prior art, when a sharp temperature change occurs, electric discharging may occur between the substrate 1 and the dummy block 6. That is, the problem of a decrease in quality of a modulated optical signal that is caused by a pyroelectric effect still remains.

SUMMARY

According to an aspect of the present invention, an optical modulator includes: a ferroelectric substrate in which an input optical waveguide, a pair of branched optical waveguides that are optically coupled to the input optical waveguide, and an output optical waveguide that is optically coupled to the pair of branched optical waveguides are formed; a signal electrode that is formed in a vicinity of at least one of the pair of branched optical waveguides; a first protection member that is attached to an input end of the ferroelectric substrate in which the input optical waveguide is formed; and a second protection member that is attached to an output end of the ferroelectric substrate in which the output optical waveguide is formed. The first protection member and the second protection member have a Mohs hardness that is less than or equal to a Mohs hardness of the ferroelectric substrate, and are formed of a glass material that does not have a pyroelectric effect.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 2A:
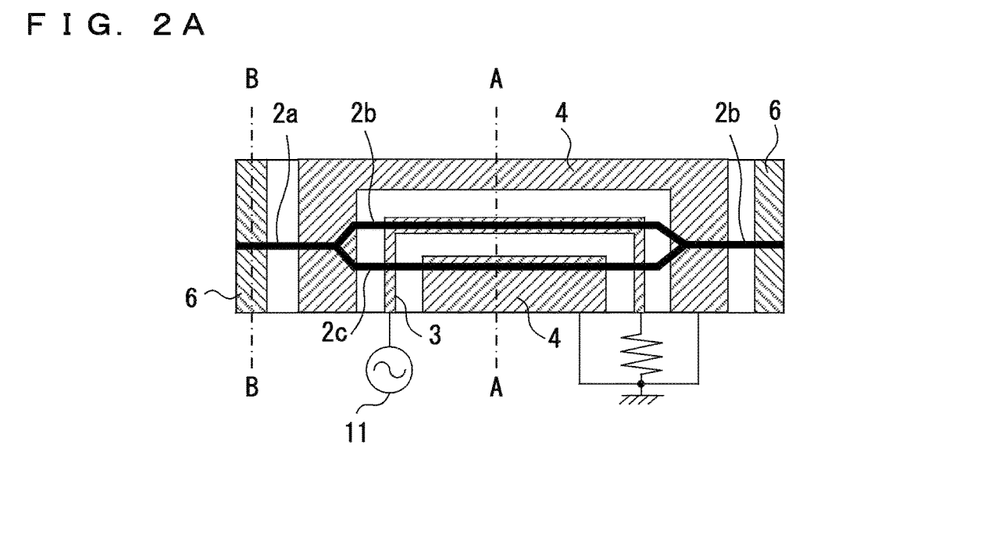
FIGS. 2A and 2B are diagrams explaining operations of an optical modulator.
Figure 2B:
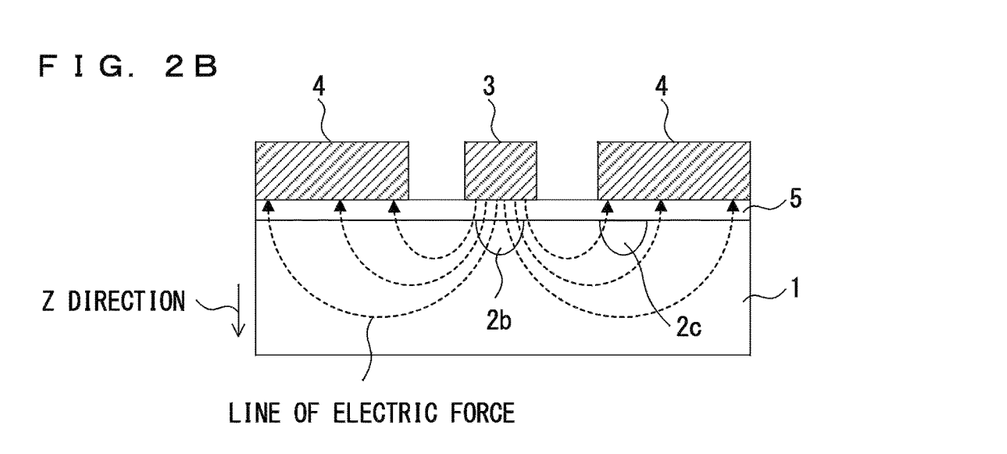

FIGS. 2A and 2B are diagrams explaining operations of an optical modulator in accordance with an embodiment of the invention. The configuration of the optical modulator depicted in FIGS. 2A and 2B are substantially the same as that depicted in FIGS. 1A and 1B. That is, the optical modulator includes a substrate 1, an input optical waveguide 2a, a pair of straight optical waveguides 2b and 2c, an output optical waveguide 2d, a signal electrode 3, a ground electrode 4, a buffer layer 5, and dummy blocks (protective members) 6. As depicted in FIG. 2A, one end of the signal electrode 3 is electrically connected to an electric signal generator 11. The other end of the signal electrode 3 is terminated using a resistor.

In this example, the substrate 1 is a Z-cut LiNbO3 substrate. However, the material for the substrate 1 may be another ferroelectric material. For example, the material for the substrate 1 may be LitaO3 (lithium tantalite) or PLZT ((Pb, La, Zr, Ti)O3).

In the optical modulator of the above configuration, continuous wave light that is generated by a laser light source (not illustrated) is input to the input optical waveguide 2a. The input light is branched and is guided to the straight optical waveguides 2b and 2c. The light propagated via the straight optical waveguides 2b and 2c is combined and is output via the output optical waveguide 2d.

Here, when an electric signal is fed to the signal electrode 3, an electric field is generated between the signal electrode 3 and the ground electrode 4 as illustrated in FIG. 2B. Then, due to an electro-optic effect of LiNbO3 that is caused by the electric field, the refractive indexes of the straight optical waveguides 2b and 2c change. That is, a phase difference that corresponds to the electric signal is generated between the light that propagates via the straight optical waveguide 2b and the light that propagates via the straight optical waveguide 2c. Therefore, a modulated optical signal that corresponds to the electric signal is generated.

Figure 3A:
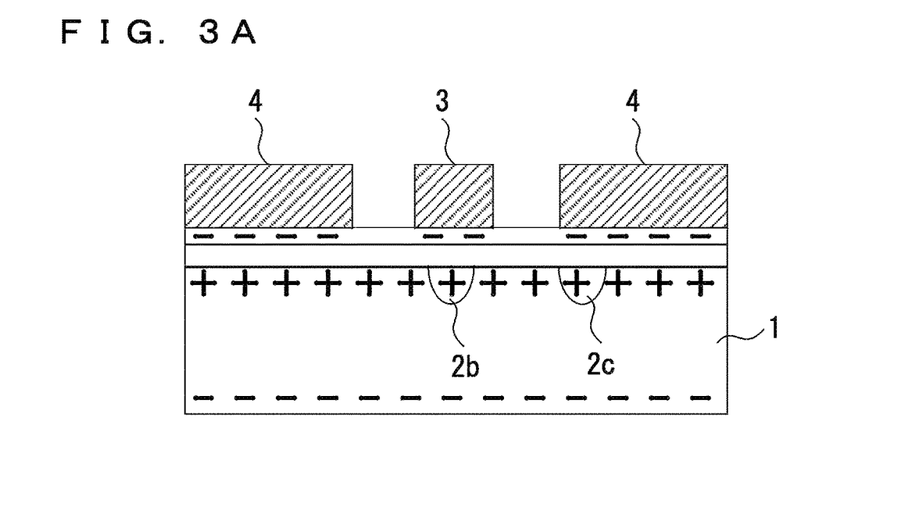
FIGS. 3A and 3B are diagrams explaining a pyroelectric effect of a ferroelectric substrate.
Figure 3B:
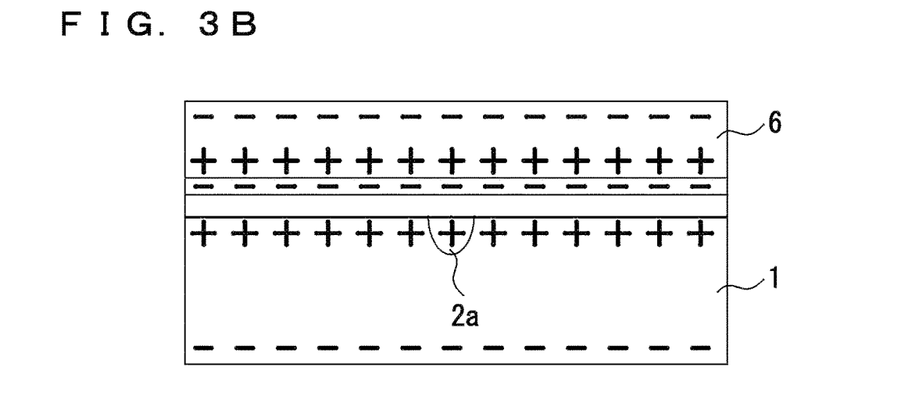

However, since the substrate 1 is a ferroelectric substrate, a pyroelectric effect is caused due to a change in temperature. Here, in a case in which the substrate 1 is a Z-cut substrate, electric charge is concentrated in an area in the vicinity of the top surface of the substrate 1 and an area in the vicinity of the bottom surface of the substrate 1 as illustrated in FIG. 3A. In the example illustrated in FIG. 3A, surplus positive electric charges exist in the area in the vicinity of the top surface of the substrate 1 and surplus negative electric charges exist in the vicinity of the bottom surface of the substrate 1. In addition, when the dummy block 6 is formed of the same ferroelectric as the substrate 1, electric charge may be concentrated in the dummy block 6, as depicted in FIG. 3B. Note that FIGS. 3A and 3B respectively illustrate A-A cross section and B-B cross section of the optical modulator illustrated in FIG. 2A.

Figure 4:
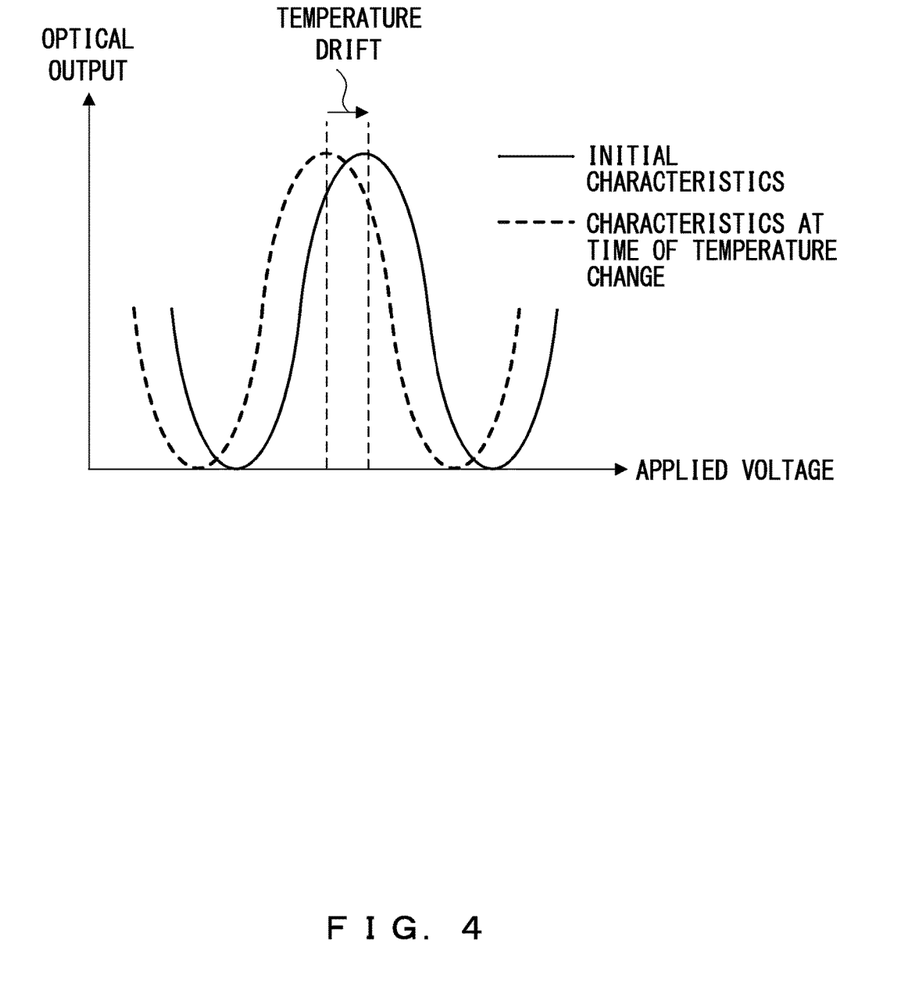
FIG. 4 is a diagram explaining a temperature drift of the optical modulator.

When uneven distribution of electric charge occurs in the substrate 1, the electric field in the substrate 1 is disturbed. Then, when the electric field in the substrate 1 is disturbed, the phase of the light that propagates via the straight optical waveguides 2b and 2c is disturbed. Therefore, a phenomenon in which an optical output curve with respect to an applied voltage is shifted occurs as illustrated in FIG. 4. In the following description, the phenomenon may be referred to as a "temperature drift". Note that when a temperature drift occurs, the operating point of the optical modulator is shifted from an optimum point. In this case, the quality of a modulated optical signal that is generated by the optical modulator deteriorates.

The amount of electric charge that is generated due to a pyroelectric effect is proportional to a temperature-change rate. Therefore, when the temperature of the optical modulator rapidly changes, the amount of electric charge accumulated in the substrate 1 and the dummy block 6 increases. Then, when the amount of electric charge that has been accumulated in the substrate 1 and the dummy block 6 exceeds a limit, the electric charge may be discharged. For example, electric discharging may occur between the substrate 1 and the dummy block 6. When such electric discharging occurs, the phases of the light that propagates via the straight optical waveguides 2b and 2c greatly change because the electric-field distribution of the substrate 1 sharply changes. Therefore, the quality of a modulated optical signal that is generated by the optical modulator deteriorates. Note that a change in the optical phase due to discharge of accumulated electric charge is sometimes referred to as a "phase jump".

In an optical modulator in accordance with embodiments of the invention, a dummy block is formed using a material that does not have a pyroelectric effect, so as to solve the problem described above. In one example, the dummy block is formed using a glass material that does not have a pyroelectric effect.

Figure 5A:
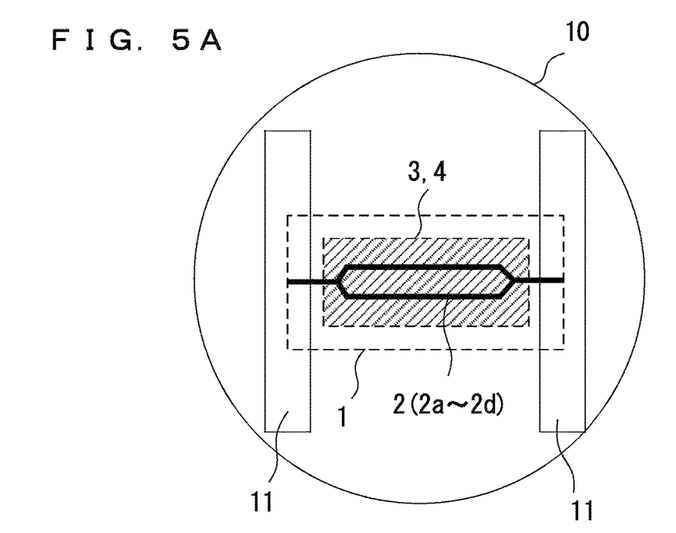
FIGS. 5A and 5B illustrate an exemplary process of manufacturing an optical modulator.
Figure 5B:
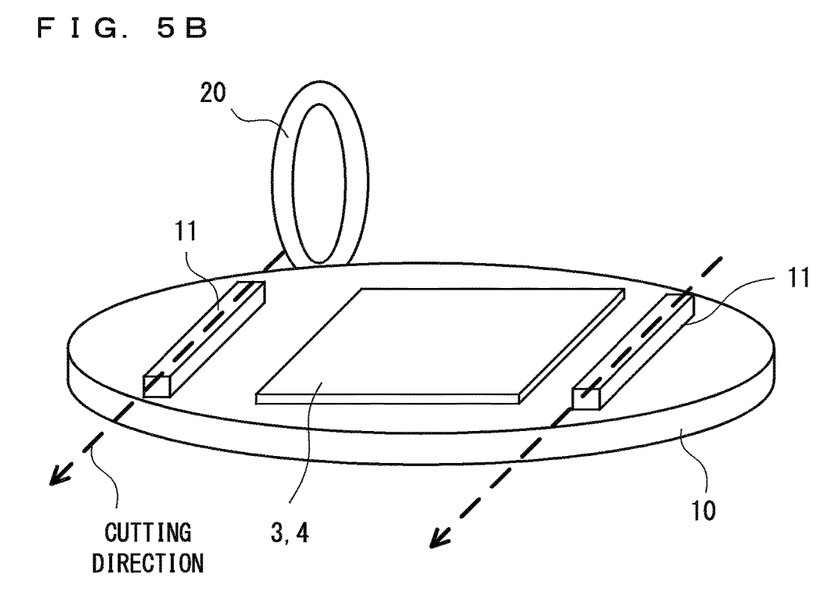

FIGS. 5A and 5B illustrate an exemplary process of manufacturing an optical modulator. The optical modulator is manufactured using a wafer 10. In this example, a material for the wafer 10 is LiNbO3. As depicted in FIG. 5A, optical waveguides 2 (an input optical waveguide 2a, a pair of straight optical waveguides 2b and 2c, and an output optical waveguide 2d) are formed in a surface region of the wafer 10. After a buffer layer has been formed, a signal electrode 3 and a ground electrode 4 are formed. Dummy blocks 11 are attached to the top surface of the wafer 10. The dummy blocks 11 are fixed to the wafer 10 using, for example, an adhesive. A material for the dummy blocks 11 is a glass material that does not have a pyroelectric effect, as will be described below.

Subsequently, an optical modulator chip is cut out from the wafer 10 using a dicing blade 20, as depicted in FIG. 5B. In this situation, the wafer 10 and the dummy block 11 are simultaneously cut. In this example, the optical modulator chip includes the optical waveguide 2 and the electrodes 3 and 4 depicted in FIG. 5A. As depicted in FIG. 5A, end portions of the optical waveguide 2 are protected by the dummy blocks 11.

The glass material that does not have a pyroelectric effect may be quartz glass, soda-lime glass, or silicate glass such as borosilicate glass. However, many types of silicate glass have a greater hardness (in this example, Mohs hardness) than a LiNbO3 substrate. Hence, if the dummy blocks 11 are formed of silicate glass, cutting an optical modulator chip out from the wafer 10 using a blade suitable for cutting the LiNbO3 substrate results in remarkable abrasion of the dicing blade 20 due to the dummy block 11.

Figure 6:
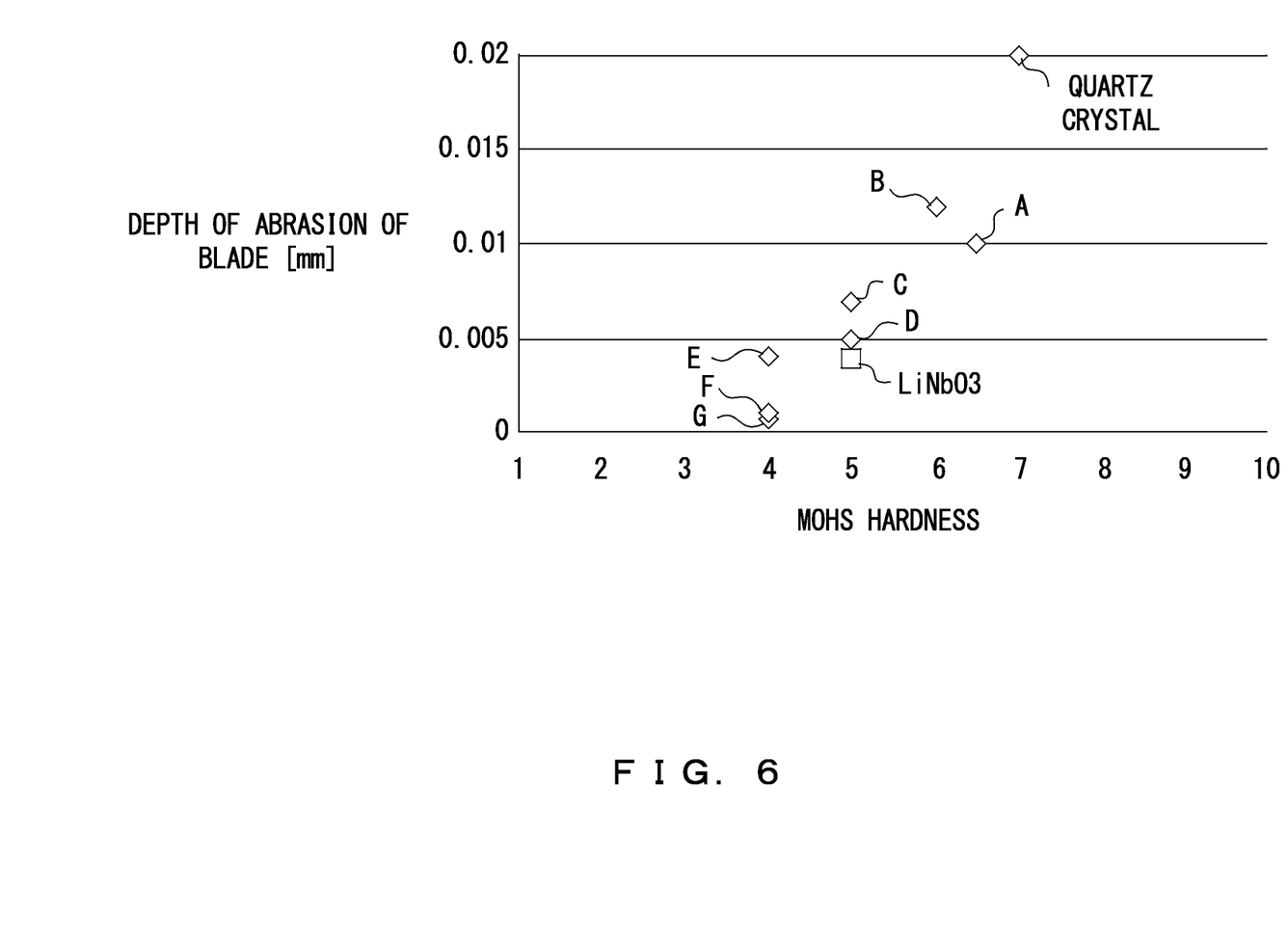
FIG. 6 illustrates an exemplary relationship between Mohs hardness and the depth of abrasion of a dicing blade.

FIG. 6 illustrates an exemplary relationship between Mohs hardness and the depth of abrasion of a dicing blade. The depth of abrasion of the dicing blade 20 after cutting one wafer is indicated on the ordinate. The LiNBO3 substrate has a Mohs hardness of 5. The following are glass materials A-G.
A: Soda-lime glass
B: Lanthanum-containing glass
C and D: Borosilicate glass
E: Bismuth-containing glass
F and G: Fluorophosphate glass In comparison with the case of cutting the LiNBO3 substrate, the depth of abrasion of the dicing blade 20 increases when a glass material that has a greater Mohs hardness than the LiNBO3 substrate (the glass materials A and B in FIG. 6) is cut. In this case, the dicing blade 20 is frequently exchanged, thereby decreasing the manufacturing capability or increasing the cost. Attempting to cut a material having a Mohs hardness of 7 (e.g., quartz crystal) using a blade suitable for cutting the LiNBO3 substrate may possibly damage the blade.

The Mohs hardness of borosilicate glass (the glass materials C and D in FIG. 6) is the same as that of the LiNBO3 substrate. However, in comparison with the case of cutting the LiNBO3 substrate, the depth of abrasion of the dicing blade 20 also increases when borosilicate glass is cut.

Meanwhile, using a blade suitable for cutting a glass material having a great Mohs hardness may possibly decrease the quality of the cut surfaces of the substrate 1. For example, the optical modulator may cause large insertion loss because end surfaces of the optical waveguides (the input optical waveguide 2a and the output optical waveguide 2d) lose specularity.

Accordingly, the dummy block 11 is preferably formed of a glass material that has a less Mohs hardness than the LiNBO3 substrate. However, many glass materials that have a less Mohs hardness than the LiNBO3 substrate have a high abrasion level. Hence, when the dummy block 11 is formed of a glass material that has a low Mohs hardness, the dummy block 11 may possibly be damaged in a dicing step and a step of processing the optical modulator chip (e.g., a step of attaching an optical fiber to the optical modulator chip).

Figure 7:
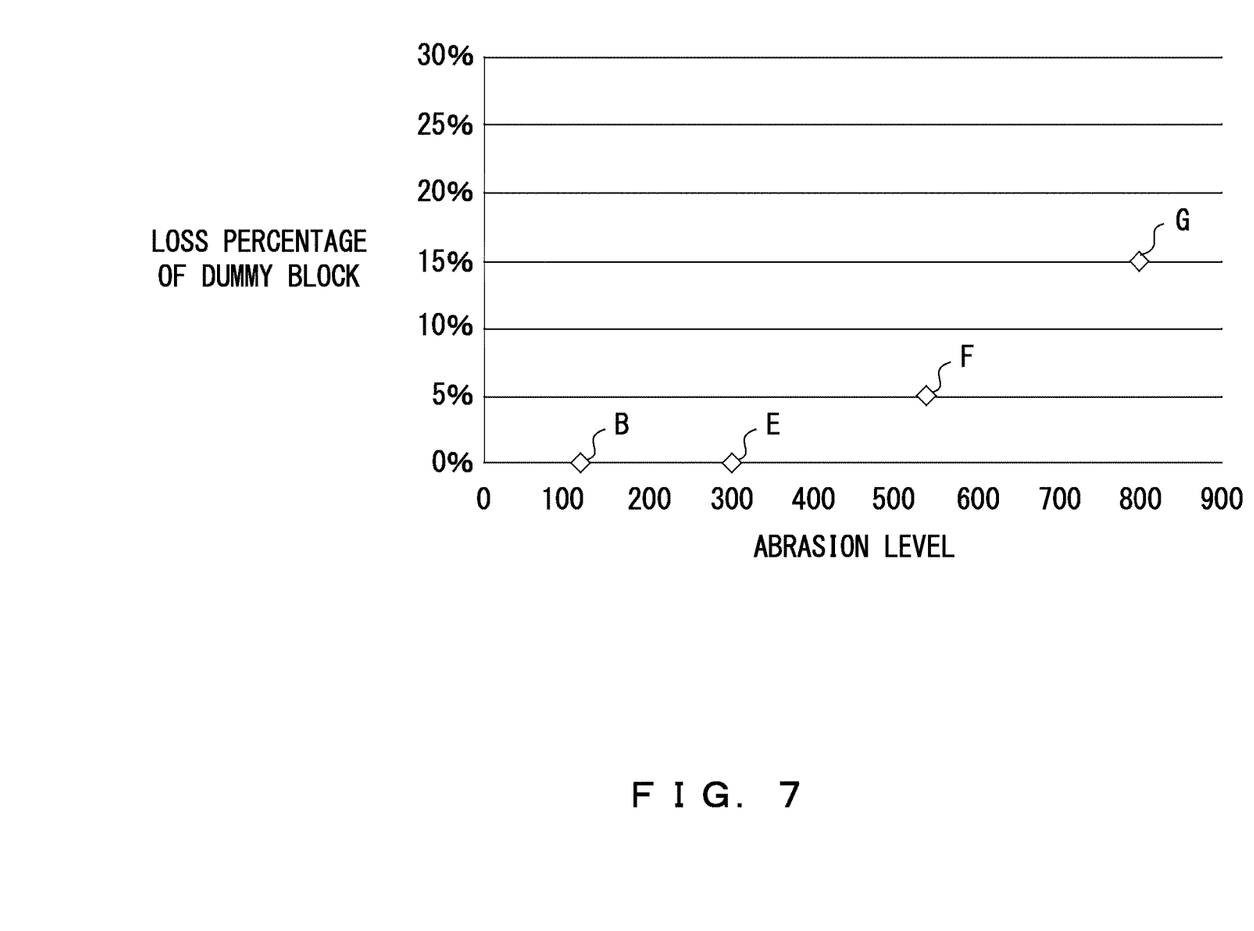
FIG. 7 illustrates an exemplary relationship between the abrasion level of glass materials and the loss percentage of a dummy block.

FIG. 7 illustrates an exemplary relationship between the abrasion level of glass materials and the loss percentage of a dummy block. The probability of the dummy block 11 that is formed of each glass material depicted in FIG. 7 being damaged in a dicing step or a step of processing the optical modulator chip is indicated on the ordinate of the graph. In this example, the abrasion level is defined by the following formula.

$$Ha=100*(W/S)/(W_0/S_0)$$

Ha indicates an abrasion level. W indicates an abrasion mass (g) of a measurement-target sample. $W_0$ indicates an abrasion mass (g) of a standard sample (in this example, a standard glass designated by the Japan Optical Glass Manufacturers' Association). S indicates the specific gravity of the measurement-target sample. $S_0$ indicates the specific gravity of the standard sample. That is, in this example, the abrasion level indicates the ratio between the following two weight losses multiplied by 100: a weight loss resulting from abrasion in lapping a sample with a certain shape (30×30×10 mm) for 5 minutes using a lapping liquid containing 20 mL of water and abrasive grains (#800) by pressing a rotating disk rotating at 60 rpm with a load (9.8N) imposed thereon, and a weight loss resulting from abrasion in testing, under the same condition as the sample above, a standard glass designated by the Japan Optical Glass Manufacturers' Association that has the same shape as the sample above.

As depicted in FIG. 7, the loss percentage of the dummy block 11 depends on the abrasion level of the glass material. In particular, as the abrasion level of the glass material becomes higher, the loss percentage of the dummy block 11 tends to be higher. To decrease the manufacturing cost for the optical modulator chip, the loss percentage of the dummy block 11 needs to be less than a specified threshold. That is, a glass material for forming the dummy block 11 is determined such that the loss percentage of the dummy block 11 becomes less than the specified threshold. When, for example, the threshold for loss percentage is 10 percent, the glass material G is not selected to form the dummy block 11.

In an embodiment of the invention, in consideration of the fact that the loss percentage of the dummy block 11 depends on the abrasion level of a glass material, a glass material for forming the dummy block 11 is selected according to an abrasion level. For example, to make the loss percentage 10 percent or less, it may be preferable that the abrasion level of the glass material be 600 or lower. In this case, as suggested in FIG. 7, the materials B, E, and F may be selected as glass materials for forming the dummy block 11.

However, the Mohs hardness of the glass material B is greater than that of the LiNBO3 substrate, as depicted in FIG. 6. Accordingly, in the examples illustrated in FIGS. 6-7, the materials E and F may be selected as glass materials for forming the dummy block 11.

The glass material E is the bismuth-containing glass K-PSFn214 by SUMITA Optical Glass, Inc., which has an abrasion level of 305. In this example, the loss percentage is 0 when the dummy block 11 is formed of the glass material E. The glass material F is the fluorophosphate glass K-GFK68 by SUMITA Optical Glass, Inc., which has an abrasion level of 540. In this example, the loss percentage is about 5 percent when the dummy block 11 is formed of the glass material F.

As described above, the dummy block 11 is formed of a material that satisfies the following three conditions.
(1) No pyroelectric effect.
(2) The Mohs hardness is less than that of the substrate 1 (e.g., a LiNBO3 substrate).
(3) The abrasion level is 600 or lower.

Condition 1 is satisfied by using a glass material. In the example depicted in FIG. 6, condition 2 is satisfied by the glass materials E-G. In the example depicted in FIG. 7, condition 3 is satisfied by the glass materials B, E, and F. In many cases, a glass material that has a great Mohs hardness has a low abrasion level. For example, the glass material B has a Mohs hardness of 6 and an abrasion level of about 100. In other words, a glass material with an abrasion level that is less than a specified threshold is likely to have a Mohs hardness that is greater than that of a LiNBO3 substrate. An estimated abrasion level that corresponds to the Mohs hardness of 5 is about 200. Hence, condition 2 can be replaced with "the abrasion level is 200 or higher". Alternatively, condition 3 may be represented as "the abrasion level is 200 or higher and 600 or lower". Aside from the glass materials E and F depicted in FIGS. 6-7, the bismuth-containing glass K-PSFn202 by SUMITA Optical Glass, Inc. can be used as a material that satisfies the three conditions above.

Figure 8A:
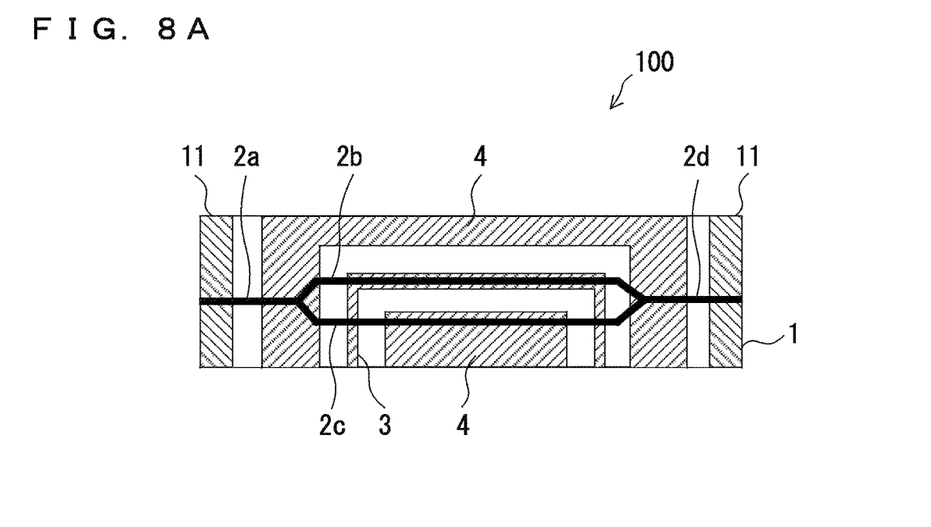
FIGS. 8A and 8B illustrate an exemplary optical modulator in accordance with a first embodiment.
Figure 8B:
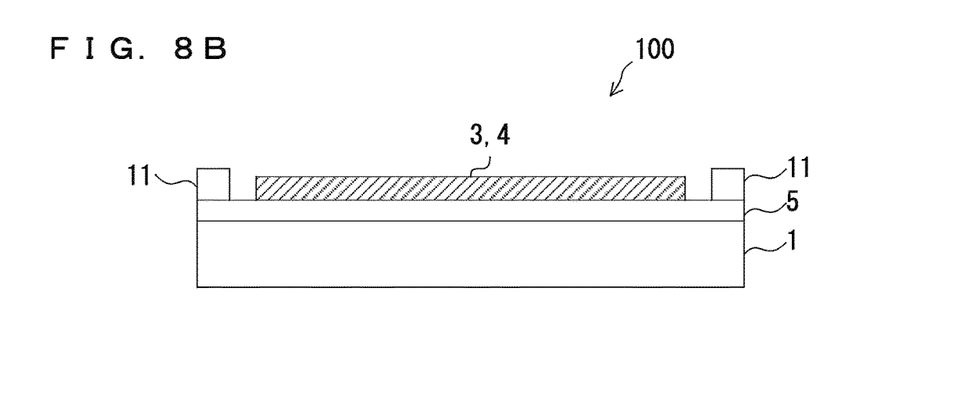

FIGS. 8A and 8B illustrate an exemplary optical modulator in accordance with a first embodiment. An optical modulator 100 in accordance with the first embodiment includes a substrate 1, a signal electrode 3, a ground electrode 4, and dummy blocks 11. Optical waveguides 2 (an input optical waveguide 2a, a pair of straight optical waveguides 2b and 2c, and an output optical waveguide 2d) are formed in a surface region of the substrate 1. The configurations of the substrate 1, the optical waveguide 2, the signal electrode 3, and the ground electrode 4 in FIGS. 1A-1B are substantially the same as those in FIGS. 8A-8B.

Unlike the case in the optical modulator depicted in FIGS. 1A and 1B, the dummy blocks 11 in the optical modulator 100 are formed of a material that satisfies the three conditions described above. In particular, the dummy block 11 is formed of a glass material that does not have a pyroelectric effect, that has a less Mohs hardness than the substrate 1 (e.g., a LiNBO3 substrate), and that has an abrasion level of 600 or lower. In the examples depicted in FIGS. 6 and 7, the glass material F or E is selected as a material for forming the dummy block 11.

As described above, since the dummy block 11 is formed of a glass material that does not have a pyroelectric effect, a pyroelectric effect does not occur in the dummy block 11 even when the temperature of the optical modulator sharply changes. Hence, electric discharging between the dummy block 11 and the substrate 1 is avoided or mitigated. This mitigates a change in phase (or phase jump) of an optical signal that is caused by a change in electric-field distribution of the substrate 1. That is, the quality of a modulated optical signal generated by the optical modulator 100 is improved. Meanwhile, since the Mohs hardness of the dummy block 11 is less than that of the substrate 1, the depth of abrasion of the dicing blade 20 in cutting an optical modulator chip from the wafer 10 is not increased, and the end surfaces of the input optical waveguide 2a and the output optical waveguide 2d are not damaged. In addition, the dummy block 11 has an abrasion level that is lower than a specified value, and thus has a low loss percentage. In the meantime, the dummy block 11 protects the input optical waveguide 2a and the output optical waveguide 2d and holds an optical fiber that is optically coupled to the optical waveguide of the optical modulator.

Figure 9A:
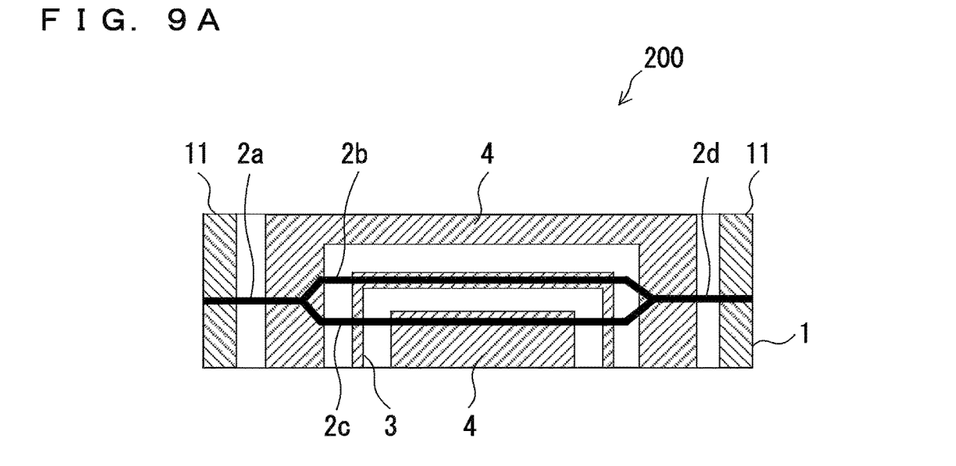
FIGS. 9A and 9B illustrate an exemplary optical modulator in accordance with a second embodiment.
Figure 9B:
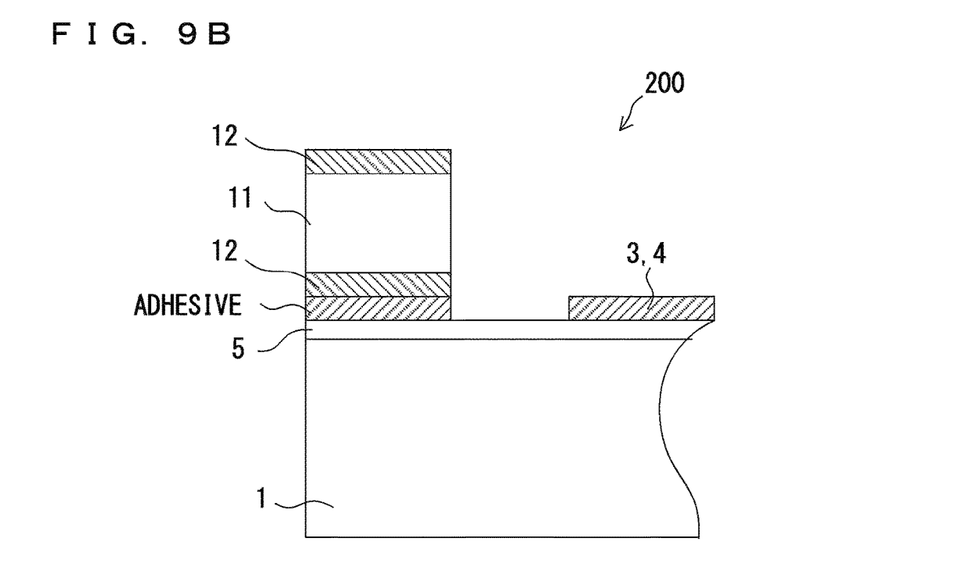

FIGS. 9A and 9B illustrate an exemplary optical modulator in accordance with a second embodiment. The configuration of an optical modulator 200 in accordance with the second embodiment is nearly the same as that of the optical modulator 100 in accordance with the first embodiment illustrated in FIGS. 8A and 8B.

The dummy blocks 11 are fixed to the substrate 1 using an adhesive. In this example, as the dummy block 11 is formed of a glass material, the dummy block 11 is fixed to the substrate 1 using, for example, an epoxy adhesive. In many cases, however, epoxy adhesives are degraded by ultraviolet rays.

For example, an ultraviolet curable adhesive may be used in fixing an optical fiber to an optical modulator chip. In this case, the ultraviolet curable adhesive is applied with the optical fiber located at a specified position on the optical modulator chip. Subsequently, the optical fiber is fixed to the optical modulator chip by irradiating the optical modulator chip with ultraviolet rays. In this situation, the ultraviolet ray could possibly degrade the epoxy adhesive.

Accordingly, in the second embodiment, a UV-cut film is provided to prevent the adhesive for fixing the dummy block 11 to the substrate 1 from being irradiated with ultraviolet rays. In particular, as depicted in FIG. 9B, a UV-cut film 12 is formed on the bottom surface of the dummy block 11. For example, the UV-cut film 12 may be evaporated onto the bottom surface of the dummy block 11. The "bottom surface of the dummy block 11" indicates a surface that is in contact with the substrate 1 from among the surfaces of the dummy block 11.

The UV-cut film 12 may be formed on the top surface of the dummy block 11. The "top surface of the dummy block 11" indicates an opposite surface from the bottom surface of the dummy block 11 from among the surfaces of the dummy block 11. In addition, the UV-cut films 12 may be formed on the bottom surface and the top surface of the dummy block 11.

Although in the examples described above the optical modulator includes one Mach-Zehnder interferometer, the invention is not limited to this configuration. The invention is also applicable to, for example, a polarization multiplexing optical modulator that includes a plurality of Mach-Zehnder interferometers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical modulator comprising:
   a ferroelectric substrate in which an input optical waveguide, a pair of branched optical waveguides that are optically coupled to the input optical waveguide, and an output optical waveguide that is optically coupled to the pair of branched optical waveguides are formed;
   a signal electrode that is formed in a vicinity of at least one of the pair of branched optical waveguides;
   a first protection member that is attached to an input end of the ferroelectric substrate in which the input optical waveguide is formed so as to protect the input optical waveguide; and
   a second protection member that is attached to an output end of the ferroelectric substrate in which the output optical waveguide is formed so as to protect the output optical waveguide,
   wherein a first optical fiber is fixed to an edge of the ferroelectric substrate using an ultraviolet curable adhesive so as to be optically coupled to the input optical waveguide,
   a second optical fiber is fixed to another edge of the ferroelectric substrate using the ultraviolet curable adhesive so as to be optically coupled to the output optical waveguide,
   the first protection member and the second protection member are fixed to the ferroelectric substrate using an epoxy adhesive so as to hold the first optical fiber and the second optical fiber, respectively,
   a UV-cut film is formed on an adhesive surface or a top surface of each of the first protection member and the second protection member, the adhesive surface contacting on the ferroelectric substrate via the epoxy adhesive, the top surface being opposite from the adhesive surface, and
   the first protection member and the second protection member have a Mohs hardness that is less than or equal to a Mohs hardness of the ferroelectric substrate, and are formed of a glass material that does not have a pyroelectric effect.

2. The optical modulator according to claim 1, wherein the glass material that forms the first protection member and the second protection member has an abrasion level of 600 or lower.

3. The optical modulator according to claim 2, wherein the glass material that forms the first protection member and the second protection member has an abrasion level of 200 or higher.

4. The optical modulator according to claim 1, wherein a material for the substrate is LiNBO3, LiTaO3, or PLZT.

* * * * *